United States Patent [19]

Ando

[11] Patent Number: 4,690,537
[45] Date of Patent: Sep. 1, 1987

[54] LENS BARREL

[75] Inventor: Makoto Ando, Osaka, Japan

[73] Assignee: Minolta Camera Kabushiki Kaisha, Japan

[21] Appl. No.: 779,185

[22] Filed: Sep. 23, 1985

[30] Foreign Application Priority Data

Sep. 25, 1984 [JP] Japan .................................. 59-199858

[51] Int. Cl.$^4$ .............................................. G03B 3/10
[52] U.S. Cl. .................................................... 354/402
[58] Field of Search ...................... 354/400, 402, 195.1, 354/195.12, 286; 350/255, 430; 355/58

[56] References Cited

U.S. PATENT DOCUMENTS 4,509,842  4/1985  Taniguchi et al. ................... 354/402
4,548,488  10/1985  Honda et al. ......................... 354/402
4,560,267  12/1985  Nakai et al. ........................... 354/412

FOREIGN PATENT DOCUMENTS 127524  10/1980  Japan .
195214  12/1983  Japan .

*Primary Examiner*—W. B. Perkey
*Attorney, Agent, or Firm*—Wolder, Gross & Yavner

[57] ABSTRACT

An automatic focusing camera includes a camera body and an interchangeable objective lens. The camera body includes a detector device exposed to the object image and a circuit providing a signal of a value in accordance with the detector device sensed difference between the object image, a predetermined focal plane and a circuit responsive to the signal for controlling a motor to rotate an amount in accordance with the signal. The objective lens includes a stationary front lens and an axially movable focusing lens which axially moves with a follower engaging the cam way of a cylindrical cam which is gear rotated by the separably coupled motor shaft. The cam is shaped whereby $\Delta\theta = C \cdot \Delta L$ wherein $\Delta\theta$ is the amount of rotation of the motor, $\Delta L$ is the axial movement of the object image and $C$ is a constant depending on the objective lens which has a ROM having information in accordance with C and which is separably coupled to the motor control circuit.

7 Claims, 12 Drawing Figures

LENS BARREL

BACKGROUND OF THE INVENTION

1. Field of the Invention

The present invention relates to a photographic lens structure having its focusing lens moved by drive means such as a motor and, more particularly, to a focusing lens movement compensating device for use in an interchangeable lens, which is coupled to a focal point detector for detecting the displacement of the position of a focused image from an intended focal plane, which device properly transforms such movement of the focusing lens to correspond to said displacement.

2. Description of the Prior Art

In the prior art, there are known many photographic lenses in which a focusing lens forming part (or all) of a photographic lens is adapted to be moved by the rotating force of a motor. In these photographic lenses, there is also known an autofocusing device in which said photographic lens is interchangeable and in which the focal point detector is attached to the camera body to detect the amount of out-of focus from the intended focal plane or an equivalent position thereby to know the displacement between the intended focal plane and the position of the focused image so that the focusing lens is automatically moved by the focusing operation in accordance with that displacement by a motor mounted in the camera body or the interchangeable lens. In that auto-focusing device, when the aforementioned displacement has a certain value, this value is transformed through a coefficient into the number of rotations of the aforementioned motor movement of the focusing lens. Here, the movement required of the aforementioned focusing lens for proper focus for a certain displacement is different depending upon the individual interchangeable lens. In other words, when a certain displacement is obtained by the focal point detector, the focus can not always be obtained if the focusing lens is moved a constant distance for all interchangeable lenses, but the focusing lens has to be moved by distances intrinsic to the respective interchangeable lens selected. Hence, the coefficient for transforming the displacement into the movement of the focusing lens is intrinsic to each interchangeable lens, and the intrinsic coefficient has to be given as information to the auto-focusing device each time the interchangeable lens is replaced by another.

A prior art device constructed to establish the intrinsic information for each interchangeable lens is disclosed in Japanese Patent Laid-Open No. 57-165821. In this publication, there is disclosed an information establishing device in which a pattern is turned by a gear rotated when the focusing lens is moved so that pulses generated by the light incident on the pattern and reflected therefrom. Since the pattern is formed alternately with highly reflective portions and lowly reflective portions, the reflected light is discontinuous and is received by a photo-receiver so that it may be converted into an electric current. At this time, by changing the pitches of the highly and lowly reflective portions of the pattern or by selecting the angular velocity of the pattern, the number of pulses generated in a manner to correspond to the certain movement of the image can be made identical, when the focusing lens is to be moved for a certain displacement until it is focused, even if the movements are different for the respective interchangeable lenses.

According to this construction, the device for generating signals such as the pulses has to be attached to each interchangeable lens with the disadvantage that the interchangeable lenses have complicated structures but also to make it impossible to solve the following problems.

Specifically, the interchangeable lens to be used in the camera is subjected to various types of focal adjustments, if necessary. However, the aforementioned coefficient is not always constant in dependence upon the types of the focal adjustment. FIG. 4 shows the individual types of the focal adjustment in the interchangeable lens. FIG. 4($a$) shows total lot-off type in which the all the components of the lens structure are integrally axially shifted or let off; FIG. 4($b$) shows the internal focusing type in which only the central group is axially shifted or let off while the front and rear groups remain stationary; and FIG. 4($c$) shows the rear focusing type in which the front group is immovable but the rear group is axially shifted or let off. In these Figures, letter o indicates lens optical axis, and letter F indicates a focusing lens group having a focal lens $f_F$. In FIGS. 4($b$) and ($c$), letter A indicates the front group having a focal distance $f_A$. In FIG. 4($b$), letter B indicates the rear group having a focal length $f_B$. Here, the infinitesimal movement of the focusing lens group F is indicated as $\Delta d$ whereas the infinitesimal displacement of the image is indicates as $\Delta L$, and the equation of the relation between $\Delta d$ and $\Delta L$ is to be determined.

First of all, for the total let-off type, as is understood from FIG. 4($a$), the relation between the infinitesimal movement $\Delta d$ of the lens group and the infinitesimal displacement $\Delta L$ of the image substantially satisfies the following equation:

$(\Delta d/\Delta L)=1$

Next, turning to FIG. 5, the equation expressing the relation between the infinitesimal movement $\Delta d$ of the focusing lens group F and the instant displacement $\Delta L$ of the focal point in the general state of the internal focusing type interchangeable lens is to be determined. Then: the distance between the object point and the principal point of the focusing lens group F having a negative power is indicated at $S_F$; the distance between the image point and the principal point as $S_F'$; the distance between the focal point and the object point as n; the distance between the focal point and the image point as n'; and the magnification as $\beta_F$. From the relations of $S_F=f_F+n$ and $S_F'=f_F-n'$ and from the well-known formula of $\beta_F=-f_F/n=n'/f_F$, the following equations are obtained:

$$S_F=f_F(1-(1/\beta_F)) \qquad 1$$

$$S_F'=f_F(1-\beta_F) \qquad 2$$

If $D_F=S_F+S_F'$, $\Delta D_F=\Delta S_F+\Delta S_F+\Delta S_F'$, Into this equation, the equations 1 and 2 are substituted after they have been differentiated:

$$\Delta D_F = \left( \frac{1}{\beta_F^2} - 1 \right) f_F \cdot \Delta \beta_F \qquad 3$$

Since the front group A is immovable in FIG. 5, its image point is determined irrespective of the state of the focal adjustment, if the object point concerning the front group is fixed at one point. Since the image point of the front group can be deemed as the object point of the focusing lens group F, the aforementioned $S_F$ is determined only by the position of the focusing lens group F. Hence, the infinitesimal change $\Delta S_F$ of $S_F$ becomes equal to the infinitesimal movement $\Delta d$ of the focusing group F, as is expressed by $\Delta d = \Delta S_F$. Into this equation, the equation 1 is differentiated and substituted:

$$\Delta d = \frac{f_F}{\beta_F^2} \cdot \Delta \beta_F \qquad \qquad 10$$

Into this equation, $\Delta \beta_F$ is substituted from the equation 3, following by the rearrangement:

$$\Delta d = \frac{1}{1 - \beta_F^2} \cdot \Delta D_F \qquad \qquad 3$$

In respect to the rear group B having a positive power, on the other hand, the distance between the focal point and the object point is indicated as m, and the distance between the focal point and the image point is indicated as m'. Then, the well-known formula $m \cdot m' = -f_B^2$ (wherein $f_B$ indicates the focal length of the rear group) is differentiated to $\Delta m = f_B^2/m'^2 \cdot \Delta m'$, into which the formula $m'/f_B = \beta_B$ (wherein $\beta_B$ indicates the magnification of the rear group) also well known in the art is substituted:

$$\frac{\Delta m'}{\Delta m} = \beta_B^2$$

Here, the infinitesimal change of the object point of the rear group B is equal to that of the image point of the focusing lens group F, and the infinitesimal change of said image point becomes equal to that of $D_F$ because the image point of the front group A, i.e., the object point of the focusing lens group F is determined. That is to say, $\Delta m = \Delta D_F$. Since the rear group B is immovable, moreover, its image has an infinitesimal change $\Delta L$ equal to that of m'. Hence, $\Delta m' = \Delta L$.
Hence, $$\frac{\Delta L}{\Delta D_F} = \beta_B^2 \qquad \qquad 4$$

From the equations 3 ' and 4 :

$$\frac{\Delta d}{\Delta L} = \frac{1}{1 - \beta_F^2} \cdot \frac{1}{\beta_B^2} \qquad \qquad 5$$

FIG. 6 shows the state (FIG. 6(a)), in which the internal focusing type interchangeable lens is focused at an infinite distance, and the state (FIG. 6(b)) in which the focusing lens group F is moved therefrom by a distance X. If the state of FIG. 6(b) is applied to the equation 5 showing the general state, then:

$$Ko(X) = \frac{1}{1 - \beta_{FX}^2} \cdot \frac{1}{\beta_B^2} \qquad \qquad 5'$$

wherein:
$K_o(X)$ indicates the ratio of the infinitesimal movement of the focusing lens group to the infinitesimal displacement of the focal point; and
$\beta_{FX}^2$ indicates the magnification of the focusing lens group at X.

If the state of FIG. 6(a) and FIG. 6(b) is applied to the aforementioned equation 2, moreover, then:

$$S'\infty = f_F(1 - \beta_F \infty) \qquad \qquad 6$$

$$S'x = f_F(1 - \beta_{FX})$$

$$\therefore X = S'x - S'\infty$$

$$= f_F(\beta_F\infty - \beta_{FX})$$

If the $\beta_{FX}$ from the equation 6 is substituted into the equation 5, then:

$$Ko(X) = \frac{\Delta d}{\Delta L} = \frac{1}{\beta_B^2 \left\{ 1 - \left( \beta_{F\infty} - \frac{x}{f_F} \right)^2 \right\}} \qquad 7$$

Here, the following relation holds among the focal length $f_A$ of the front group A, the magnification $\beta_F$ of the focusing lens group and their combined focal length $f_{AF}$:

$$f_{AF} = f_A \cdot \beta_F \qquad \qquad 8$$

Likewise, the following relation holds among the combined focal length $f_{AF}$ of the front group and the focusing group, the combined focal length f of all the groups and the magnification $\beta_B$ of the rear group:

$$f = f_{AF} \beta_B \qquad \qquad 9$$

The equation of $f_{AF} = f_A \beta_F$, which is made by applying the equation 8 into FIG. 6(a), and the equation 9 are substituted into the equation 7 and are rearranged. Then, the following relative equation of the internal focusing type lens is obtained:

$$Ko(X) = \frac{\Delta d}{\Delta L} = \frac{1}{\left( \frac{f}{f_{AF}} \right)^2 \left\{ 1 - \left( \frac{f_{AF}}{f_A} - \frac{x}{f_F} \right)^2 \right\}} \qquad 10$$

As can be understood from the equation 10, the relation between the infinitesimal movement $\Delta d$ of the focusing lens group F and the infinitesimal displacement $\Delta L$ of the image becomes a function of the movement X of the focusing lens group F from the infinite focal point. In other words, the displacements of the image are different even if the focusing lens group is moved an equal distance, in the cases of the focusing states of long distance and short distance.

If the $K_o(X)$ is also determined for the rear focusing type interchangeable lens, the following equation is obtained by setting $\beta_B = 1$ in the equation 5 because it is possible to assume that the magnification of the rear group of the internal focusing type is 1:

$$Ko(X) = \frac{\Delta d}{\Delta L} = \frac{1}{1 - \beta_F^2} \qquad \qquad 11$$

FIG. 7 shows the state (FIG. 7(a)), in which the rear focusing type interchangeable lens is focused at infinity, and the state (FIG. 7(b)) in which the focusing lens group F is moved therefrom by the distance X. The state of FIG. 7(b) is applied to the equation 11, then:

$$Ko(X) = \frac{1}{1 - \beta_{FX}^2} \qquad 11'$$

If the state of FIG. 7(a) is applied to the foregoing equation 2, then like the internal focusing case the following equation holds:

$$X = f_F(\beta_{F\infty} - \beta_{FX}) \qquad 6$$

Hence, from the equations 6 and 11', the following equation is obtained:

$$Ko(x) = \frac{\Delta d}{\Delta L} = \frac{1}{1 - \left(\beta_{F\infty} - \frac{x}{f_F}\right)^2} \qquad 12$$

Like the internal focusing case, too, the equation of $f_{AF} = f_A \cdot \beta_F$ obtained from the equation 8 is substituted into the equation 12. Then, the following relation in the rear focusing type lens is obtained:

$$Ko(x) = \frac{\Delta d}{\Delta L} = \frac{1}{1 - \left(\frac{f}{f_A} - \frac{x}{f_F}\right)^2} \qquad 13$$

As can be understood from the equation 13, the relation of Δd and DL is a function of X, too, in the rear focusing interchangeable lens.

Thus, the ratio of the infinitesimal displacement of the image to the infinitesimal let-off of the lens group is substantially fixed in the total let-off type interchangeable lens but is the function of X, as is expressed by the equations 10 and 13 in the internal or rear focusing type interchangeable lens.

Those equations 10 and 13 are plotted in the graph of FIG. 8. These graphical representations are made by substituting the actual numerical values into the equations for the respective total let-off, internal focusing and rear focusing type interchangeable lenses. Therefore, the numerical values become variously different depending upon the lens structures, but the trends of the graphs have similarities for the focal adjusting types. For the internal and rear focusing types, as is understood from the graphs of FIG. 8, the movements required of the focusing lenses are different even for the equal displacement of the focusing position in the long shot and close-up photographies and have to be corrected. As a result, the coefficient corresponding to the photographic distance has to be transmitted as a variable amount of information from the interchangeable lens to the auto-focusing device, and the interchangeable lens mount has to be equipped with an encoder and a variable resistor so that the lens mount is large-sized, complicated and has a raised production cost. In addition, the information such as the aforementioned coefficient has to be transferred between the camera body and the interchangeable lens so that contacts or the like are required to further increase the complexity. There arises another problem that the precision is degraded by the limit to the resolution of the encoder itself or by the mounting error of the variable resistor.

SUMMARY OF THE INVENTION

In view of the prior art thus far described, the present invention has as an object the provision of a correcting device for use in an interchangeable lens, which is driven to be focused by an auto-focusing device, to move a focusing lens a necessary distance by energizing an auto-focusing motor in a predetermined extent for a predetermined displacement of the focal point irrespective of the focal adjustment type of the interchangaeble lens.

According to the present invention, when the rotation of a rotating member, which is mounted in an interchangeable lens coupled to a camera body having focal point detecting means for detecting the displacement of an object image from an intended focal plane and which is adapted to be driven by drive means for outputting a driving force corresponding to a signal transmitting said displacement, is to be transmitted to a focusing lens, a cam having a lead for establishing such a ratio that the infinitesimal rotation Δθ of said rotating member and the infinitesimal displacement ΔL of the focal point is expressed by Δθ=C·ΔL (wherein C indicates a constant) is arranged so that the driving force may be transmitted by said cam means.

With the structure thus far described, according to the present invention, when the focal detecting means detects a predetermined displacement, a focusing lens of a variety of interchangeable lenses such as an internal or rear focusing lens can be correctly moved to the focal point merely by rotating the rotating member a predetermined amount with respect to the displacement detected.

DESCRIPTION OF THE PREFERRED EMBODIMENTS

Figure 1:
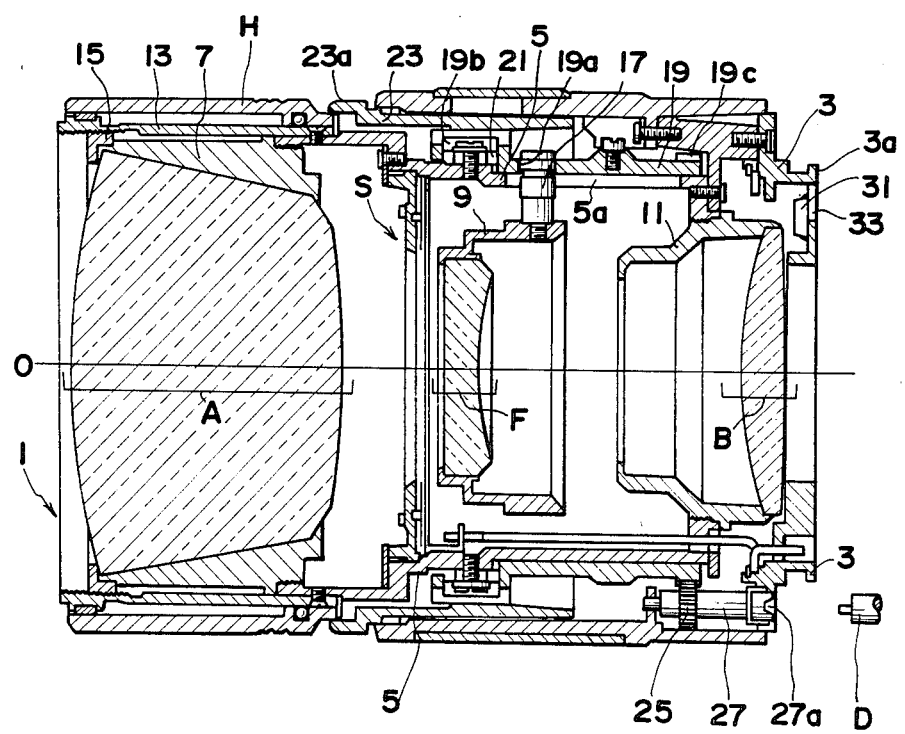
FIG. 1 is a sectional view showing an interchangeable lens according to a first embodiment of the present invention.

The present invention will be described following in connection with the embodiments thereof with reference to the accompanying drawings. FIG. 1 shows the first embodiment of the present invention. The present embodiment is directed to the internal focusing type interchangeable lens which is removably coupled to the camera body by means of a bayonet 3. The interchangeable lens 1 consists of three groups of lenses: the first or front group A, the second or internal group F and the third or rear group B in front of the lens mount (i.e., leftward of the drawing). For the focusing operation, only the second group F is moved along the optical axis O.

The interchangeable lens 1 is constructed of: a stationary portion which is fixed directly or indirectly on the bayonet 3 by means of a screw so that it is held immovable relative to the camera body to be coupled thereto; and a movable portion which can move relative to the stationary portion. A stationary cylinder 5 belongs to the stationary portion, and the lenses belonging to the third group B are held immovably in the inner circumference close to the rear end of the stationary cylinder 5 through a third holding frame 11. In the inner circumference close to the front end of the stationary cylinder 5, moreover, the lenses belonging to the first group A are held immovably through a first holding frame 7. Incidentally, in order to hold the first holding frame 7, a front cylinder 13 and an accessory ring 15 are used in association with the stationary cylinder 5.

On the other hand, the stationary cylinder 5 is formed with a straight groove 5a which is parallel with the optical axis, and a pin 17 extends through the stationary cylinder 5 from a second holding frame 9 which holds the lenses of the second group F. On the other hand, a cam ring or cylinder 19 is fitted only rotatably on the outer circumference of the stationary cylinder 5. The cam ring 19 can be turned smoothly with the aid of a roller 21, which is mounted on the outer surface of the stationary cylinder 5, in a recess 19b which is formed in the circumferential direction thereof. Moreover, the cam ring 19 is formed with a cam groove 19a in which is fitted the leading end of the aforementioned pin 17 extending through the straight groove 5a of the stationary cylinder 5. As a result, when the cam ring 19 is turned, the second holding frame 9 prevented from turning by the fitted engagement of the straight groove 5a and the pin 17 is allowed to move straight following the lead of the cam groove 19a.

The cam ring 19 is turned in the following manner. First of all, a manual ring 23 is fixed on the outer circumference of the cam ring 19 by means of a screw or the like. The manual ring 23 has a portion exposed to the outer surface of the interchangeable lens 1 to form an operation portion 23a so that the cam ring 19 is turned integrally with the operation portion 23a if the latter is turned.

On the other hand, the cam ring 19 is formed on the outer circumference of its rear end portion with a gear 19c. With this gear 19c, there engages a gear 25 for turning the former shaft 19c. That gear 25 is formed coaxially of a follower gear 27 which has its portions near the front and rear ends borne and supported in a rotatable manner by a stationary portion. Moreover, the follower shaft 27 has its rear end formed with a groove 27a which is exposed to the rear portion of the interchangeable lens 1 in the vicinity of the aforementioned bayonet 3. When the interchangeable lens 1 is coupled to the camera body (although not shown) by the bayonet 3, a drive shaft D, which is mounted in the camera body and adapted to be rotated by a motor, comes into engagement with the groove 27a of the follower shaft 27 so that the follower shaft 27 and the gear 25 are rotated to turn the cam ring 19 through the gear 19c.

Incidentally, the letter H indicates a built-in lens hood which is fitted in the vicinity of the front end of the outer circumference of the interchangeable lens 1 such that it can move back and forth in the direction of the optical axis. On the other hand, letter S indicates a stop the explanation of which is omitted because it has no relationship with the gist of the present invention.

An ROM 31 is disposed in the vicinity of the rear end of the interchangeable lens 1. The ROM 31 is stored with such information concerning the interchangeable lens 1 as contains a movement transforming coefficient KL (which is a constant). This information stored is outputted through a contact 33 which is disposed in the plane of the rear face of the bayonet 3. As a result, when the signal pin at the camera body side comes into contact with that contact 33, the information can be transmitted to the camera body.

Figure 2:
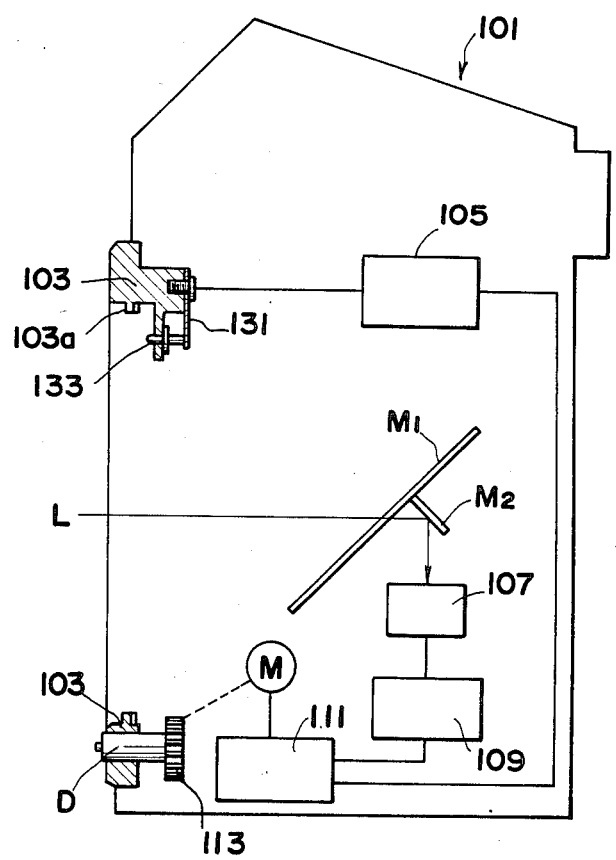
FIG. 2 is a diagrammatic view conceptionally showing the camera body which is suitable for the lens of the same embodiment.

FIG. 2 schematically shows the camera body which is constructed to be coupled to the interchangeable lens 1 of FIG. 1. A camera 101 is formed with a bayonet 103 for meshing with the aforementioned bayonet 3 formed on the interchangeable lens 1 to couple this lens 1 and the camera 101. Said bayonet 103 is equipped with a contact pin 133 which is biased to have its leading end protruding in the direction (i.e., leftward of the drawing) in which the interchangeable lens 1 is attached. Said contact pin 133 is not only biased but also brought into abutment against a conductive leaf spring 131 so that it is electrically connected. As a result, while the camera 101 and the interchangeable lens 1 are being coupled, the contact pin 133 is retracted against the biasing force to make the aforementioned coupling smooth without any obstruction. At the end of this coupling, moreover, the contact pin 133 is brought into elastic contact with the aforementioned contact 33 to effect transmission of the signal by the aforementioned biasing force. The leaf spring 131 is connected through a CPU 105 with a motor drive circuit 111 and a motor M.

In the camera 101, on the other hand, there is disposed a main mirror $M_1$ for guiding an object light L coming through the interchangeable lens 1 into a finder. There is also disposed an auxiliary mirror $M_2$ for guiding the light, which has passed through a transparent portion formed at the center of the main mirror $M_1$, downward of the camera 101. The light reflected by the auxiliary mirror $M_2$ enters a focal point detecting element 107. This element 107 is connected with the aforementioned motor drive circuit 111 through an arithmetic circuit 109 for computing the focal displacement $\Delta L$.

To the output shaft (although not shown) of the motor M, on the other hand, there is connected through a not-shown gear connecting portion a gear 113 which is coaxially mounted on the drive shaft D. This drive shaft D is rotatably supported by the bayonet 103 so.

The operations of the present embodiment will be described in the following. When the interchangeable lens 1 is to be attached to the camera 101, their respective bayonets 3 and 103 are fitted to each other and are turned a predetermined angle to the optical axis to bring their respective pawls 3a and 103a into engagement with each other. At this time, the contact pin 133 mounted in the camera 101 is brought by the elasticity of the leaf spring 131 into electrical contact with the contact 33 of the interchangeable lens 1, and the drive shaft D of the camera 101 and the follower shaft 27 of the interchangeable lens 1 are connected to each other. Now, let it be assumed that the interchangeable lens 1 is in a state with from the object which is located in the photographic range out of focus and which is to be focused. Then, the image of the object is not focused on the focal point detecting element 107 but is out of focus. The focal point detecting element 107 outputs a signal corresponding to the incident light, and the arithmetic circuit 109 computes the displacement $\Delta L$ in response to that signal. And, this displacement $\Delta L$ is inputted to the motor drive circuit 111.

On the other hand, the signal corresponding to the movement transforming coefficient KL stored in the ROM of the interchangeable lens 1 is inputted through the contact 33 and the contact pin 133 to the CPU 105 and further to the motor drive circuit 111. This motor drive circuit 111 computes the desired rotation _R of the drive shaft D necessary for the focusing operation from both the displacement ΔL and the movement transforming coefficient KL to rotate the motor M the desired extent thereby to rotate the drive shaft D through the gear connecting portion (although not shown) and the gear 113. In accordance with the drive shaft D, the follower shaft 27 is rotated to turn the cam ring 19 through the gears 25 and 19c. When this cam ring 19 is turned, the pin 17 having been blocked from rotating by the straight groove 5a is moved parallel to the optical axis in accordance with the lead of the cam groove 19a so that the lenses of the second group F are moved together with the second holding frame 9 to effect the focusing operation.

Here, the infinitesimal displacement ΔL of the image and the corresponding infinitesimal rotation (corresponding to that of the cam ring) ΔR of the drive shaft D have such a relation as is expressed by the following equation:

$$K_L(x) = \frac{\Delta R}{\Delta L} = \frac{1}{\mu} \cdot \frac{1}{l} \cdot Ko(x) \qquad 14$$

wherein:
  $\mu$ indicates the reduction ratio from the follower shaft to the cam ring; and
  l indicates the lead of the cam groove.

In the equation 14 , the term ΔR/ΔL is a function $K_L(X)$ of X (i.e., the movement of the second group of lenses in the interchangeable lens from the infinite focal point) but can be made into a constant independent of X by suitably setting the lead l of the cam groove in accordance with X. Now, if this constant is indicated as $K_L$, the turning angle of the cam ring from the infinite focal point at $\theta$, and the lead of the cam groove according to X and l(X), then:

$$\text{from } \frac{l(x)}{2\pi} = \frac{\Delta X}{\Delta \theta} \qquad 15$$

$$l(x) = 2\pi \frac{\Delta X}{\Delta \theta}$$

If the letter l of the equation 14 is replaced by l(X), and the equation 15 is substituted into the equation 14 , then:

$$\frac{\Delta \theta}{\Delta X} = 2\pi \cdot \mu \cdot K_L \frac{1}{Ko(x)} \qquad 16$$

If this equation is integrated with X, then:

$$\theta = 2\pi \cdot \mu \cdot K_L \int \frac{1}{Ko(x)} \cdot \Delta X \qquad 17$$

If the equation 10 is substituted into the equation 17 together with the conditions of X=0 and $\theta$=0 when the second group of lenses is positioned at the infinite focal point, then:

$$\theta = 2\pi \cdot \mu \cdot K_L \left(\frac{f}{f_{AF}}\right)^2 \left(\left(1 - \frac{f_{AF}^2}{f_A^2}\right) X + \right. \qquad 18$$

-continued $$\left. \frac{f_{AF}}{f_A \cdot f_F} X^2 - \frac{1}{3} \cdot \frac{1}{f_F^2} X^3 \right)$$

If the cam groove is formed to have the lead based on the relation between $\theta$ and X expressed by the equation 18 , then the ratio $K_L(X)$ between the infinitesimal rotation of the drive shaft and the infinitesimal displacement of the image becomes the constant $K_L$, and the following equation is obtained from the equation 14 :

$$K_L = \frac{\Delta R}{\Delta L} \qquad 14'$$

Here, since the reduction ratio from the drive shaft to the cam ring is the constant $\mu$, the following equation is obtained:

$$\Delta \theta = \mu \cdot \Delta R \text{ i.e., } \Delta R = \frac{\Delta \theta}{\mu}$$

If this equation is substituted into the equation 14 ', then:

$$K_L = \frac{1}{\mu} \cdot \frac{\Delta \theta}{\Delta L}$$

$$\therefore \Delta \theta = \mu \cdot K_L \cdot \Delta L$$

Since both $\mu$ and $K_L$ are constant, $\alpha\theta = C \cdot \gamma L$ (wherein C indicates a constant).

Therefore, the infinitesimal movement of the image relative to the infinitesimal turning angle of the cam ring is fixed at a constant. In other words, when a predetermined image displacement is detected, the second group of lenses can be moved to the focal point in accordance with X, i.e., the distance from the infinite focal point merely by rotating the drive shaft a predetermined rotation so as to turn the cam ring a predetermined extent.

Figure 3:
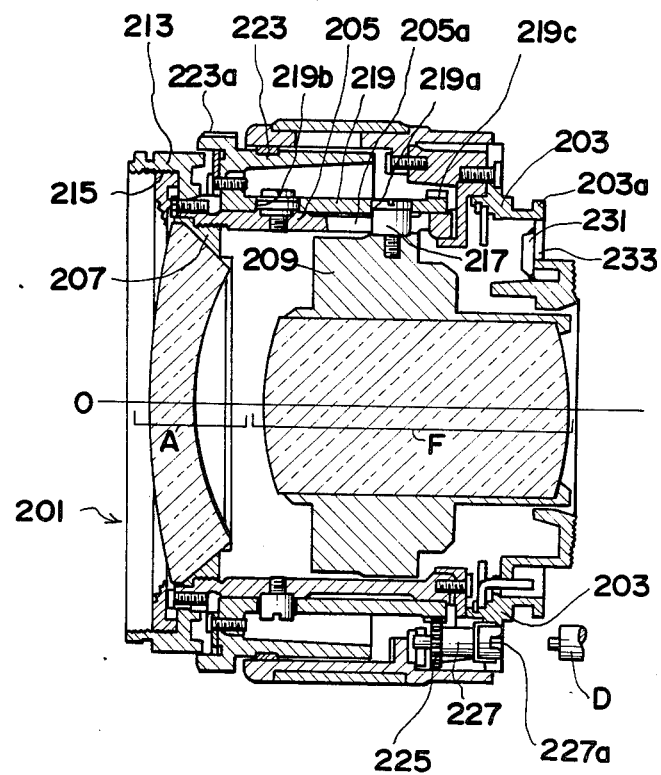
FIG. 3 is a sectional view showing a second embodiment of the present invention.
Figure 4A:
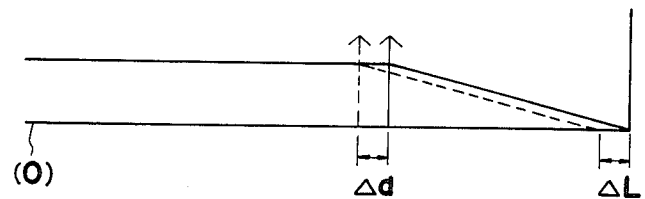
FIGS. 4a–4c, 5, 6a, 6b, 7a, and 7b are explanatory views showing the optical paths of the interchangeable lenses.
Figure 4B:
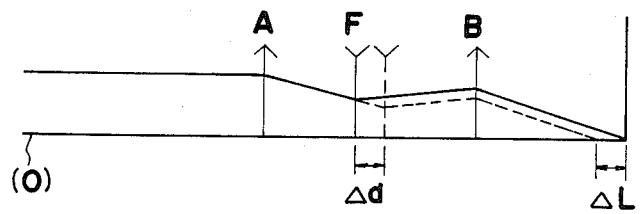
Figure 4C:
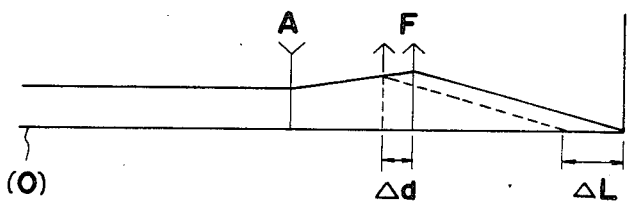
Figure 5:
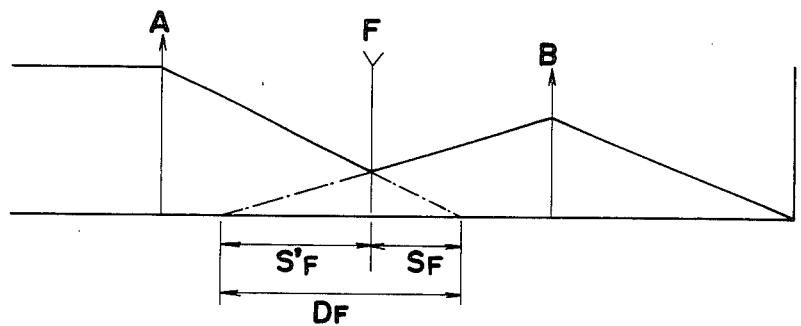
Figure 6A:
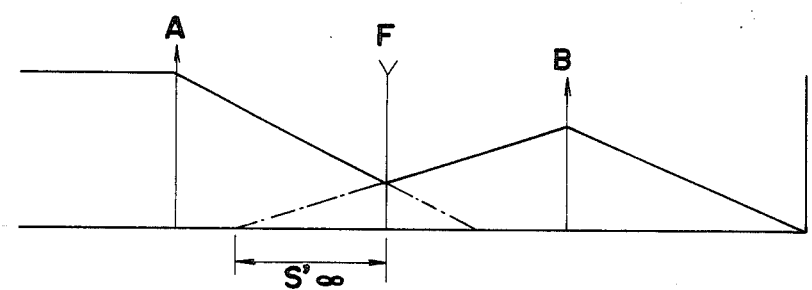
Figure 6B:
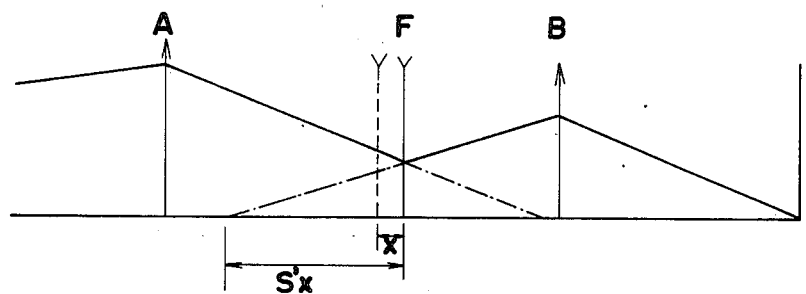
Figure 7A:
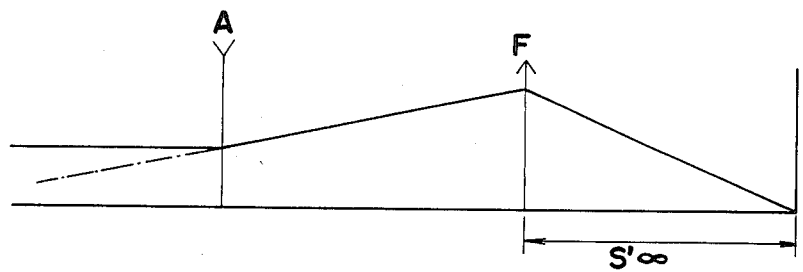
Figure 7B:
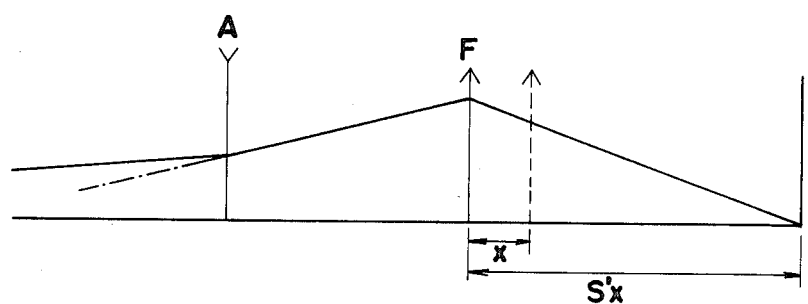
Figure 8:
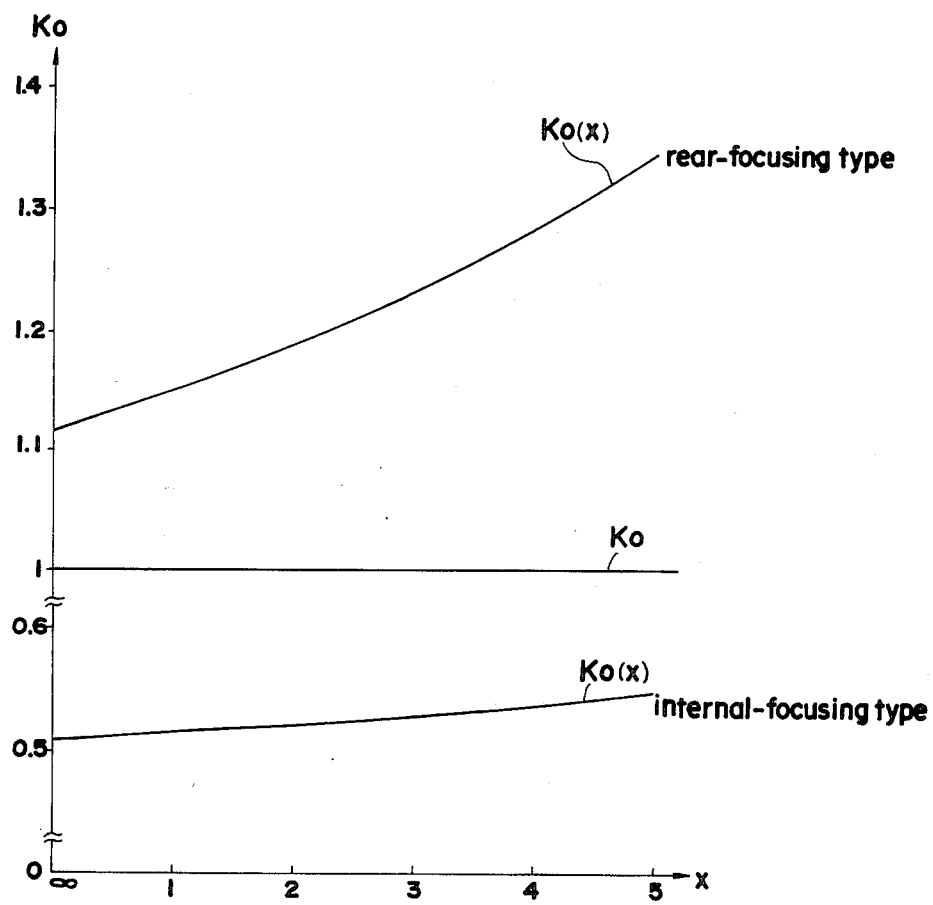
FIG. 8 is an explanatory graph comparing the ratio, i.e., $K_o(X)$ between the Δd and ΔL against the position of the focusing lens for the respective focal adjustment types.

FIG. 3 shows a second embodiment of the present invention, which is directed to the rear focusing lens. An interchangeable lens 201 is composed of two groups of lenses: a front first group A and a rear second group F. Upon the focusing operation, only the second group F is moved along the optical axis O.

The interchangeable lens 201 in the present embodiment also has a stationary cylinder 205, and a first holding frame 207 is screwed in the inner circumference close to the front end of the stationary cylinder 205 so that it holds the lenses of the first group A stationary. Moreover, a front cylinder 213 and an accessory ring 215 are mounted fixedly on the front end of the stationary cylinder 205. Still moreover, the stationary cylinder 205 is also formed with a straight groove 205a, and a pin 217 extends through the stationary cylinder 205 from a second holding frame 209 for holding the lenses of the second group F. On the outer circumference of the stationary cylinder 205, on the other hand, there is fitted a cam ring 219 which is held only rotatably by a pin anchored to cylinder 205 and engaging a circumferential groove 219b formed in said cam ring 219. Moreover, the cam ring 219 is formed with a cam groove 219a, in which is fitted the pin 217 extending through the straight groove 205a of the stationary cylinder 205. As a result, when the cam ring 219 is turned, the second holding frame 209 is linearly moved in accordance with the head of the cam groove 219a.

The turning of the cam ring 219 is effected like in the foregoing first embodiment either by manually turning a manual ring 223 or by transmitting the driving force of the motor from a follower shaft 227 through gears 225 and 219c.

The structure of the camera body is the same as that of the first embodiment, as is shown in FIG. 2. Moreover, the operations are also the same so that further explanations are omitted. At this time, the lead of the cam groove setting the ratio of the infinitesimal rotation of the drive shaft and the infinitesimal displacement of the image at the constant $K_L$ will be determined in the following. Like the foregoing first embodiment:

$$\theta = 2\pi \cdot \mu \cdot K_L \int \frac{1}{K_o(x)} \Delta X \qquad 19$$

If the equation 12 is substituted into the equation 19 and if the conditions when the second group lenses are placed in the infinite focal point are X=0 and $\theta$=0, then:

$$\theta = 2\pi \cdot \mu \cdot K_L \left( \left(1 - \frac{f^2}{f_A^2}\right) X + \frac{f}{f_A f_F} X^2 - \frac{1}{3} \cdot \frac{1}{f_F^2} X^8 \right) \qquad 20$$

If the cam groove having the lead based upon the relation of $\theta$ and X expressed by the equation 20, then the second group lenses can be moved to the focal point merely by setting the ratio of the infinitesimal rotation of the drive shaft and the infinitesimal displacement of the image at the constant $K_L$, by satisfying the equation of $\Delta\theta = C \cdot \Delta L$ like the first embodiment, and by rotating the drive shaft a predetermined extent so as to turn the cam ring a predetermined extent with respect to the a predetermined image displacement.

Incidentally, the embodiments thus far described are directed only to the structure in which the drive means (such as the motor) is mounted in the camera body. Despite this fact, the drive means may be mounted in the interchangeable lens. Moreover, it is quite natural that the turning means may have a variety of rotating cylinders and gears in addition to the follower shaft and the cam ring of the described.

In the embodiments thus far described, the lead of the cam groove is determined from the equation of $\theta$ and X by solving the optical equations. Despite this fact, however, numerical solutions may be determined directly from the foregoing equations 10 and 12 so that the values $\theta$ and X can be determined from $K_o(X)$.

As has been described hereinbefore, according to the present invention, when the rotations of a rotating member, which is mounted in an interchangeable lens coupled to a camera body having focal point detecting means for detecting the displacement of an object image from an intended focal plane and which is adapted to be driven by drive means for outputting a driven force corresponding to a signal transmitting said displacement, are to be transmitted to a focusing lens, a cam having a lead for establishing such a ratio that the infinitesimal rotation $\Delta\theta$ of said rotating member and the infinitesimal displacement $\Delta L$ of a focal point is expressed by $\Delta\theta = C \cdot \Delta L$ (wherein C indicates a constant) is formed so that the driving force may be transmitted by said cam means. As a result, with the structure thus far described, according to the present invention, when the focal detecting means detects a predetermined displacement, the focusing lens of a variety of interchangeable lenses such as the internal or rear focusing lens can be correctly moved to the focal point merely by rotating the rotating member a predetermined amount with respect to that displacement detected.

What is claimed is:

1. A lens barrel detachably attached to a camera including focus detaching means detecting an amount of an aberration of positions between a predetermined focal plane and an image surface, signal means generating a focus detecting signal corresponding to said aberration amount and driving means moving in response to said signal, said lens barrel comprising:
   storage means for storing a fixed coefficient for tranforming said aberration amount to a focus detecting signal corresponding to said amount;
   information means for generating said fixed coefficient to said signal means of said camera;
   an optical lens system including a stationary front element and a movable element movably supported along its optical axis for focusing;
   a rotating member rotated by said driving means; and
   a cam means for moving said movable element along its optical axis in response to the rotation of said rotating member,
   wherein said cam means is formed such that the degree of rotation ($\Delta\theta$) of said rotating member and the amount of movement ($\Delta L$) of said image surface have a following relation:

$\Delta\theta = C \cdot \Delta L$
   (wherein C is a constant).

2. A lens barrel as defined in claim 1, wherein said rotating member comprises a driven shaft detachably attached to said driving means for being rotated by said driving means and a rotating barrel rotated by said driven shaft.

3. A lens barrel as defined in claim 2, wherein said cam means is formed in said rotating barrel.

4. An automatic focusing system comprising:
   focus detecting means for detecting the amount of an aberration of positions between a predetermined focal plane and an image surface;
   signal means for generating a focus detecting signal corresponding to said aberration amount;
   storage means for storing a fixed coefficient for tranforming said aberration amount to a focus detecting signal corresponding to said amount;
   information means for generating said fixed coefficient to said signal means;
   rotatory driving means rotatable in response to said signal;
   an optical lens system including a stationary front element and a movable element movably supported along its optical axis for focusing; and
   a cam means moving said movable element along its optical axis in response to the rotation of said rotatory driving means,
   wherein said cam means is formed such that the degree of rotation ($\Delta\theta$) of said rotatory driving means and the amount of movement ($\Delta L$) of said image surface have the following relation:

$\Delta\theta = C \cdot \Delta L$ (wherein C is a constant).

5. An automatic focusing system as defined in claim 4, wherein said rotatory driving means comprises a driving motor having a rotating shaft and a rotating barrel surrounding and coaxial with said focusing lens.

6. An automatic focusing system as defined in claim 5, wherein said cam means is formed in said rotating barrel.

7. A lens barrel detachably attached to a camera, comprising:

focus detecting means for detecting the amount of aberration of position between a predetermined focal plane and an image surface;

signal means for generating a focus detecting signal corresponding to said amount;

storage means for storing a fixed coefficient for transforming said aberration amount to the focus detecting signal corresponding to said amount;

information means for generating said fixed coefficient to said signal means;

rotatory driving means rotatable in response to said signal;

an optical lens system including a stationary front element and a movable element movably supported along its optical axis for focusing; and a cam means for moving said movable element along its optical axis in response to the rotation of said rotatory driving means, wherein said cam means is formed such that the degree of rotation ($\Delta\theta$) of said rotatory driving means and the amount of movement (66 L) of said image surface have the following relation:

$\Delta\theta = C \cdot \Delta L$ (wherein C is a constant).

* * * * *